US012310911B1

(12) United States Patent
Cao

(10) Patent No.: US 12,310,911 B1
(45) Date of Patent: May 27, 2025

(54) AUXILIARY STIMULATING APPARATUS

(71) Applicant: Ruhot Technology INC., Chino Hills, CA (US)

(72) Inventor: Ruyi Cao, Chino Hills, CA (US)

(73) Assignee: Ruhot Technology INC.

( * ) Notice: Subject to any disclaimer, the term of this patent is extended or adjusted under 35 U.S.C. 154(b) by 0 days.

(21) Appl. No.: 18/626,223

(22) Filed: Apr. 3, 2024

(51) Int. Cl.
*A61H 19/00* (2006.01)

(52) U.S. Cl.
CPC ..... *A61H 19/30* (2013.01); *A61H 2201/1692* (2013.01)

(58) Field of Classification Search
CPC ........ A61H 19/00; A61H 19/30; A61H 19/32; A61H 19/50; A61H 2201/1692; A61F 13/00059
See application file for complete search history.

(56) References Cited

U.S. PATENT DOCUMENTS

| | | | | |
|---|---|---|---|---|
| 2002/0107431 A1* | 8/2002 | More | ..................... | A61H 19/32 600/38 |
| 2005/0027162 A1* | 2/2005 | Paled | ..................... | A61H 19/44 264/222 |
| 2006/0264856 A1* | 11/2006 | Wong | ..................... | A61H 19/32 604/349 |
| 2017/0071818 A1* | 3/2017 | Chen | ..................... | A61H 19/32 |

* cited by examiner

*Primary Examiner* — Carrie R Dorna
(74) *Attorney, Agent, or Firm* — ScienBiziP, P.C.

(57) ABSTRACT

An auxiliary stimulating apparatus is provided, the auxiliary stimulating apparatus provides a cavity for accommodating a to-be-treated portion, so as to provide massage experience by friction between the to-be-treated portion and a cavity wall surrounding the cavity, and includes: a main body which is flexible and comprising a channel, the channel is hollow and extends from an outer side of the main body to an inner side of the main body; and a sub-body configured for being flexible and detachably accommodated in the channel of the main body, the sub-body comprises an opening defined on one end of the sub-body and is exposed exterior to the channel when the sub-body is received in the channel, and the cavity is defined inside the sub-body, the cavity is in air communication with the opening, so that the to-be-treated portion is insertable into the cavity via the opening.

15 Claims, 16 Drawing Sheets

100

AUXILIARY STIMULATING APPARATUS

TECHNICAL FIELD

The disclosure relates to the field of medical devices, and in particular to an auxiliary stimulating apparatus.

BACKGROUND

Erectile dysfunction (ED) is commonly referred to as "Asynodia" or "sexual impotence", and refers to the inability of men to achieve or maintain an erection that completes sexual intercourse, and the erectile dysfunction may affect the sexual intercourse, and is the most common male sexual dysfunction in clinics. Therefore, a variety of erection assisting devices have been known in the prior art to assist patients with erectile dysfunction in achieving a prolonged erectile function. However, the current erection assisting device is generally an integrated structure, which is not conducive to cleaning.

BRIEF DESCRIPTION OF DRAWINGS

The drawings illustrate the embodiments and form a part of the specification, together with a written description of the specification, to explain the exemplary embodiment of the embodiment. It is obvious that the drawings in the following description are only some embodiments of the present disclosure. For ordinary technical personnel in the art, other drawings can be obtained based on these drawings without any creative labor. In all drawings, the same reference numerals refer to similar but not necessarily identical elements.

DETAILED DESCRIPTION

In order to make the purpose, technical solution, and advantages of the present disclosure clearer, further detailed descriptions will be given below in conjunction with the accompanying drawings. Obviously, the described implementation methods are only a part of the implementation methods of the present disclosure, not all of them. Based on the implementation methods in the present disclosure, all other implementation methods obtained by ordinary technical personnel in this field without creative labor fall within the scope of protection of the present disclosure.

Embodiments of the present disclosure will be described in detail hereinafter with reference to the accompanying drawings.

First Embodiment

Figure 1:
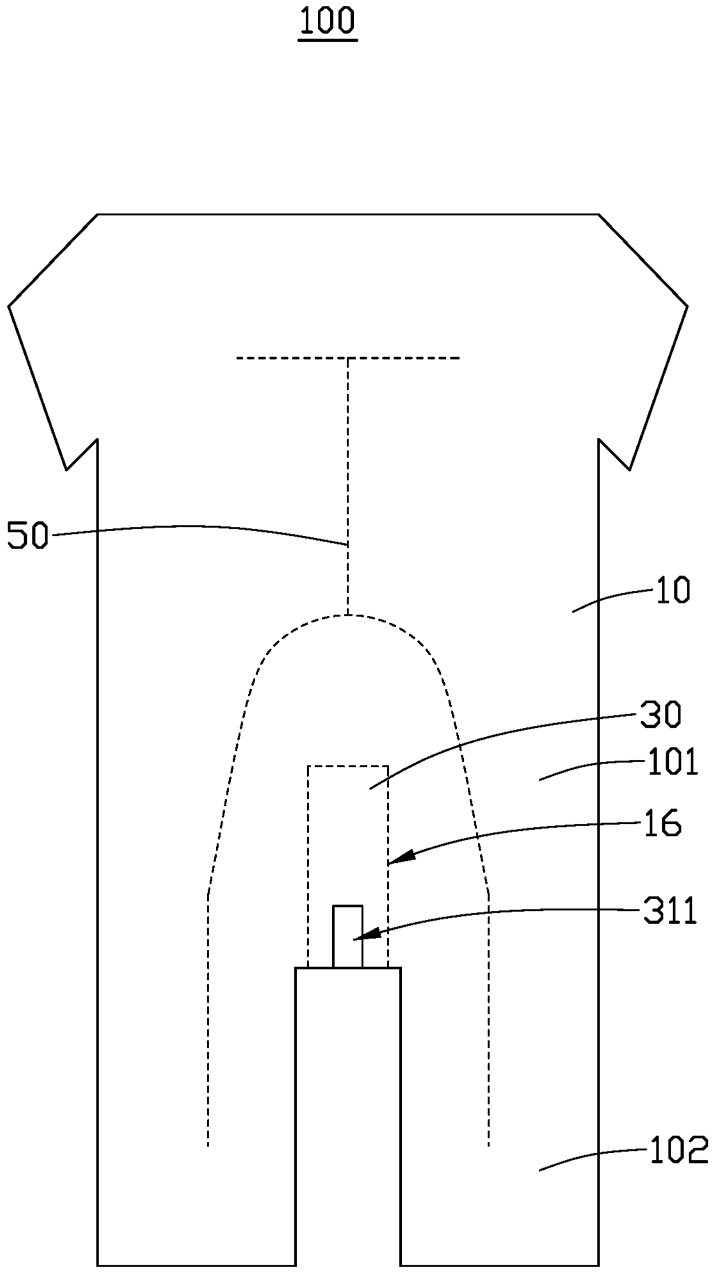
FIG. 1 is a schematic structure diagram of an auxiliary stimulating apparatus according to a first embodiment of the present disclosure.

Referring to FIG. 1, a first embodiment of the present disclosure provides an auxiliary stimulating apparatus 100 configured for stimulating a to-be-treated portion of a human body and assisting erection. Furthermore, in this embodiment, a male sexual organ is taken as an example of the to-be-treated portion, and the auxiliary stimulating apparatus 100 has a function of assisting men in achieving erections for a long time.

The auxiliary stimulating apparatus 100 comprises a main body 10, a sub-body 30 and a support member 50. The sub-body 30 is detachably accommodated in the main body 10. The support member 50 is fixed in the main body 10 and is configured for supporting the main body 10.

In one embodiment, the main body 10 comprises a first portion 101 arranged along a first direction and a second portion 102 arranged at a variable angle to the first portion 101, the first direction is a height direction of the main body 10 when the auxiliary stimulating apparatus 100 in a standing state, branches of the support member 50 are arranged in the main body 10 corresponding to the first portion 101 and the second portion 102, the support member 50 further comprises a connecting portion (second connecting portion 56 described below), and the connecting portion is arranged at a correspondingly connection position between the first portion 101 and the second portion 102.

Specifically, referring to FIG. 2 and FIG. 3, the main body 10 is configured for being flexible and comprises a first vertical portion 11, a second vertical portion 13, a first transverse portion 14 and a second transverse portion 15, the second vertical portion 13 is located above the first vertical portion 11, and the first transverse portion 14 and the second transverse portion 15 are located below the first vertical portion 11 and extend from an same end of the first vertical portion 11, the first transverse portion 14 and the second transverse portion 15 are arranged in a U-shape.

In this embodiment, the main body 10 is configured to have a contour that is the same as that of a part of a female, such a realistic appearance is easier for the user to achieve a sense of satisfaction, thereby enabling the user to obtain a more realistic experience.

A channel 16 is defined at a bottom of the main body 10 and located between the first transverse portion 14 and the second transverse portion 15, and the channel 16 is configured for accommodating the sub-body 30. The channel 16 is configured for being hollow and extended from an outer side of the main body 10 to an inner side of the main body 10. Preferably, the channel 16 is shaped to match the outer contour of the sub-body 30.

In this embodiment, an extension direction of the channel 16 is substantially the same as an extension direction of the main body 10.

In this embodiment, the main body 10 is made of a soft material, making the user feel the real skin sensation when touching the auxiliary stimulating apparatus 100.

Figure 2:
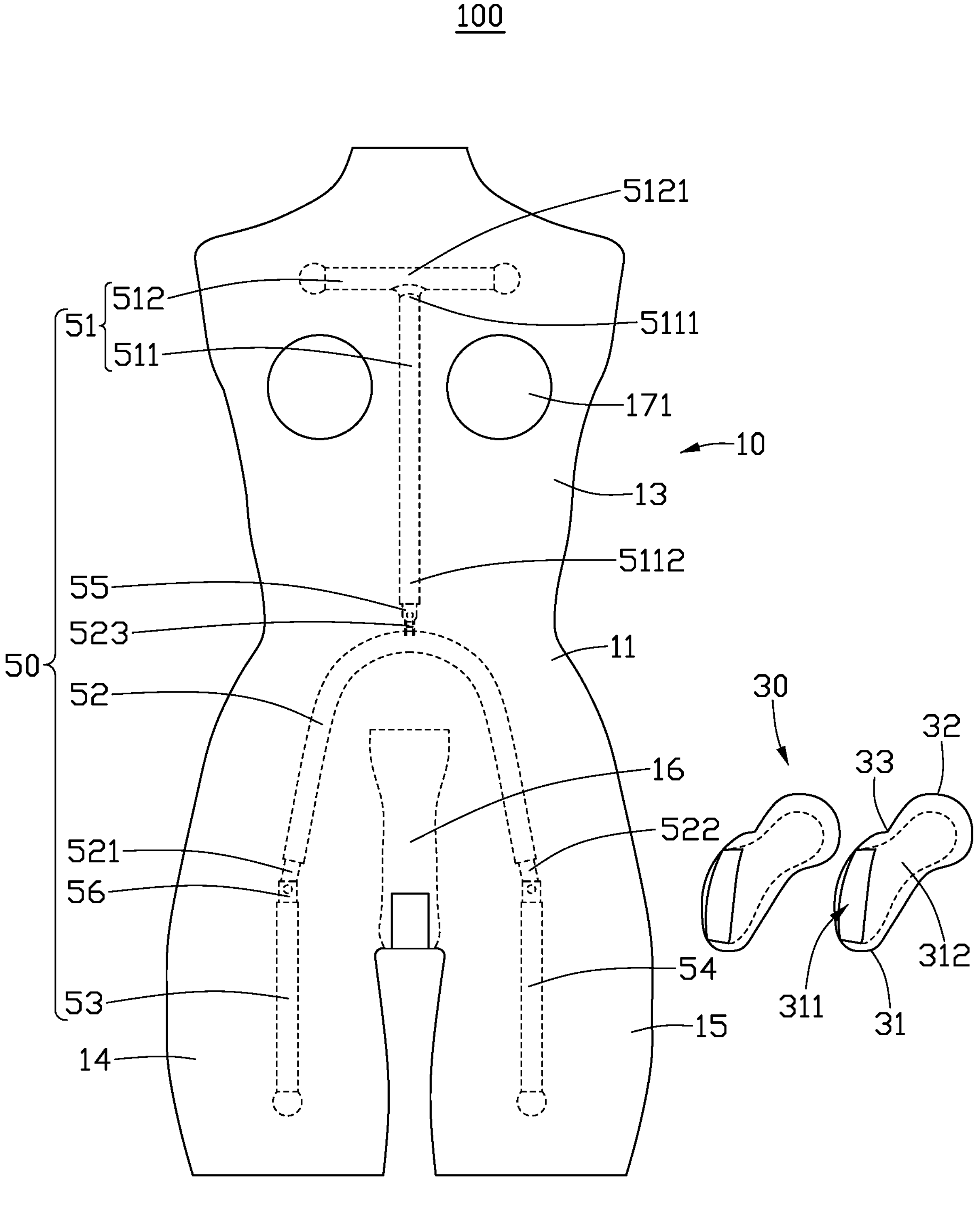
FIG. 2 is a front view of the auxiliary stimulating apparatus provided by an embodiment of the present disclosure.
Figure 3:
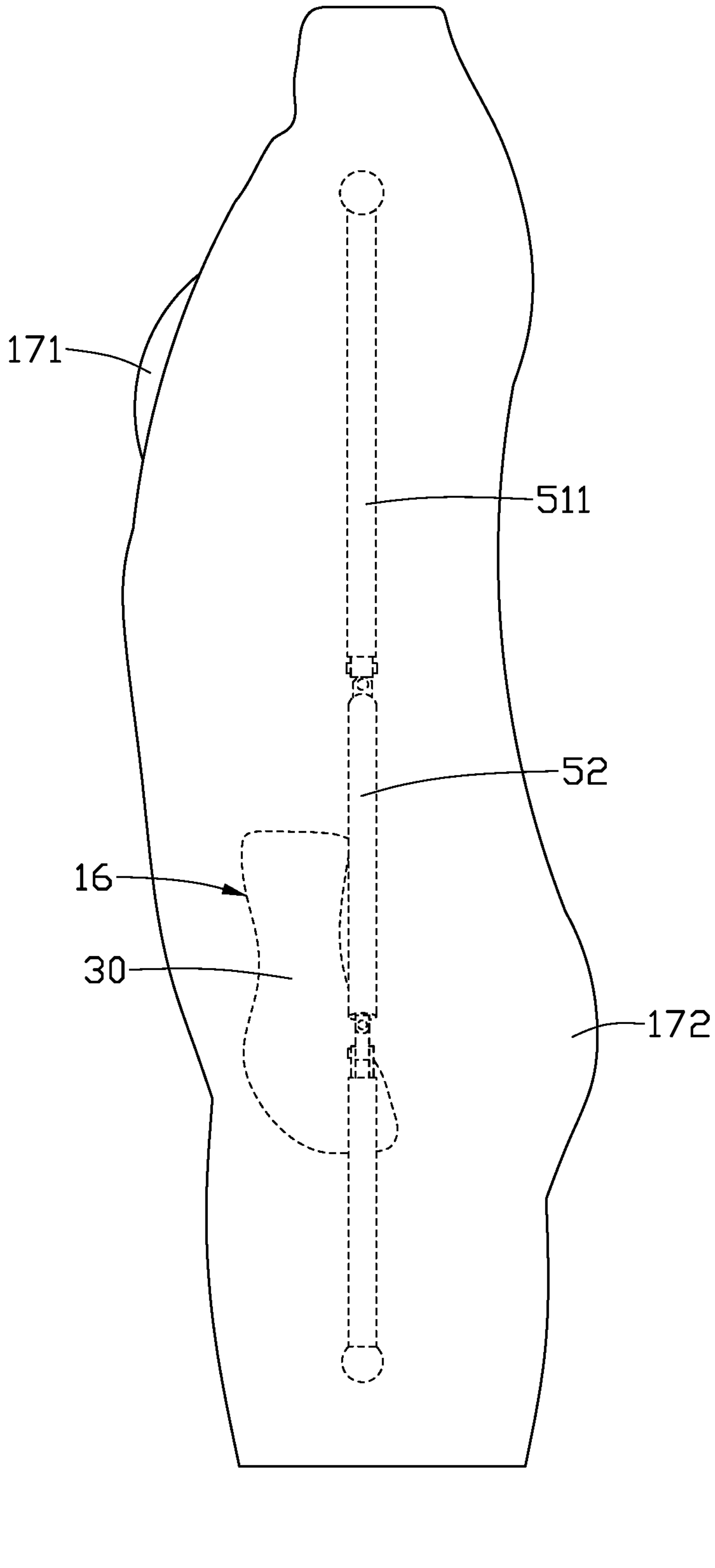
FIG. 3 is a side view of the auxiliary stimulating apparatus shown in FIG. 2.

Specifically, referring to FIG. 2 and FIG. 3, the main body 10 further comprises a first soft portion and a second soft portion integrally formed with the first soft portion, the second soft portion comprises a pair of first software portion 171 and a second software portion 172, the first soft portion is the portion of the main body 10 excluding the pair of first software portion 171 and the second software portion 172, the second soft portion is softer than the first soft portion. In this way, the pair of first software portion 171 and/or the second software portion 172 are made of a softer material, and when the user grips the pair of first software portion 171 and the second software portion 172, a more realistic experience can be obtained.

In other embodiments, the pair of first software portion 171 and/or the second software portion 172 of the main body 10 may also be made of the same soft material as other regions, which is not limited herein.

Specifically, the first soft portion is made of a first soft material, the first soft material comprises white mineral oil and TPE material, and the white mineral oil and the TPE material are mixed in a mass ratio of 1:9 to 1:10. The second soft portion is made of a second soft material, a softness of the second soft material is greater than a softness of the first soft material. The second soft material comprises white mineral oil and TPE material, and the white mineral oil and the TPE material are mixed in a mass ratio of 1:20 to 1:30.

In other embodiments, the first soft material and/or the second soft material may further comprise a toner or a thickener, which is not limited herein.

The sub-body 30 is configured for being flexible and detachably accommodated in the main body 10, an outer contour of the sub-body 30 matches the channel 16, the sub-body 30 comprises a first end 31 and a second end 32 arranged opposite to the first end 31, the first end 31 is exposed exterior to the channel 16 when the sub-body 30 is received in the channel 16, an opening 311 is defined on the first end 31, the cavity 312 is provided inside the sub-body 30, and the cavity 312 is in air communication with the opening 311, such that the to-be-treated portion is insertable into the cavity 312 via the opening 311. In this embodiment, the auxiliary stimulating apparatus 100 provides the cavity 312 for accommodating the to-be-treated portion, so as to provide massage experience by friction between the to-be-treated portion and a cavity wall 312 surrounding the cavity 312.

In this embodiment, the sub-body 30 is made of a soft material. Further, the sub-body 30 may be made of the first soft material. In this way, it is unnecessary to prepare additional materials of different proportions, therefore, it is beneficial to simplify the manufacturing process of the auxiliary stimulating apparatus 100.

After inserting the sub-body 30 into the channel 16 of the main body 10, the sub-body 30 can be fixed in the channel 16 by means of the friction force between the sub-body 30 and the main body 10. Furthermore, both the sub-body 30 and the main body 10 are made of soft materials, which can further increase the friction force between the sub-body 30 and the main body 10 and prevent the sub-body 30 from falling off from the channel 16 of the main body 10.

In addition, in this embodiment, although the outer contour of the sub-body 30 matches the shape of the channel 16 of the main body 10, since both the main body 10 and the sub-body 30 are made of soft materials and have elasticity, the overall outer diameter of the sub-body 30 may be slightly larger than the inner diameter of the channel 16, which can further prevent the sub-body 30 from falling off the main body 10.

The sub-body 30 is configured to be detachably accommodated in the main body 10, the sub-body 30 can be detached from the main body 10 for cleaning after being used, without the need to remove the entire auxiliary stimulating apparatus 100 for cleaning, thereby facilitating use. On the other hand, the opening 311 is defined on the end of the sub-body 30 and the to-be-treated portion can be inserted into the opening 311, therefore, the user can remove the sub-body 30 from the main body 10 and use the sub-body 30 separately according to their own needs, which can meet various needs of the user and has flexible usability.

Further, the sub-body 30 comprises a first section 33, a second section 34, and a third section 35. The third section 35 is located between the first section 33 and the second section 34. The first end 31 is located at an end of the first section 33 away from the third section 35. The second end 32 is located at an end of the second section 34 away from the third section 35.

In this embodiment, an outer diameter of the second section 34 is greater than an outer diameter of the third section 35.

By making the outer diameter of the second section 34 larger than the outer diameter of the third section 35, the sub-body 30 is prevented from falling off the main body 10, thereby further enabling the sub-body 30 to be stably received in the channel 16 of the main body 10.

Further, an outer diameter of the first section 33 is also larger than the outer diameter of the third section 35, so that the first section 33 has enough space for defining the cavity and the opening 311.

In this embodiment, a weight ratio of the sub-body 30 to the main body 10 is no more than 30%.

The support member 50 is arranged inside the main body 10 and configured for supporting the main body 10. Since the main body 10 is entirely made of the soft material, there is a problem in that the main body 10 is easily deformed even if the main body 10 is large in volume, and thus it is necessary to provide the support member 50.

A material of the support member 50 is less flexible than the main body 10. In this embodiment, the support member 50 is made of metal material, so as to enable the support member 50 to better support the main body 10 and prevent deformation of the main body 10.

In this embodiment, the support member 50 comprises a bracket 51, a support portion 52, a first branch portion 53, a second branch portion 54, a first connecting portion 55, and a second connecting portion 56. The bracket 51 and the two branch portions are located at two sides of the support portion 52 respectively.

Specifically, the bracket 51 is arranged in the main body 10 corresponding to the second vertical portion 13, and the bracket 51 comprises a first rod 511 and a second rod 512 arranged substantially perpendicular to the first rod 511. In this embodiment, the first rod 511 extends along a length direction of the auxiliary stimulating apparatus 100 and comprises a top end 5111 and a bottom end 5112, the top end 5111 is an end located at the top when the auxiliary stimulating apparatus 100 in the standing state, and the bottom end 5112 is an end located at the bottom when the auxiliary stimulating apparatus 100 in the standing state. The top end 5111 of the first rod 511 is fixedly connected to a central portion 5121 of the second rod 512, so that the first rod 511 and the second rod 512 form a substantially T-shape, which can better support the auxiliary stimulating apparatus 100.

Further, the bottom end 5112 of the first rod 511 is rotatably connected to the support portion 52 via the first connecting portion 56, so that the second vertical portion 13 is rotatable relative to the first vertical portion 11. The first connecting portion 55 and the second connecting portion 56 have the same structure, and therefore the second connecting portion 56 will be described below as an example.

The support portion 52 is arranged in a region of the main body 10 corresponding to the first vertical portion 11, and the support portion 52 comprises a first connecting end 521, a second connecting end 522 and a third connecting end 523. The first connecting end 521 and the second connecting end 522 are located at one side of the support portion 52 and are rotatably connected to the first branch portion 53 and the second branch portion 54 respectively through the corresponding second connecting portion 56. The third connecting end 523 is located on the other side of the support portion 52 and is rotatably connected to the bottom end 5112 of the first rod 511. In this embodiment, since the first connection portion 55 and the second connection portion 56 have the same structure, the second connection portion 56 will be described as an example.

Figure 4:
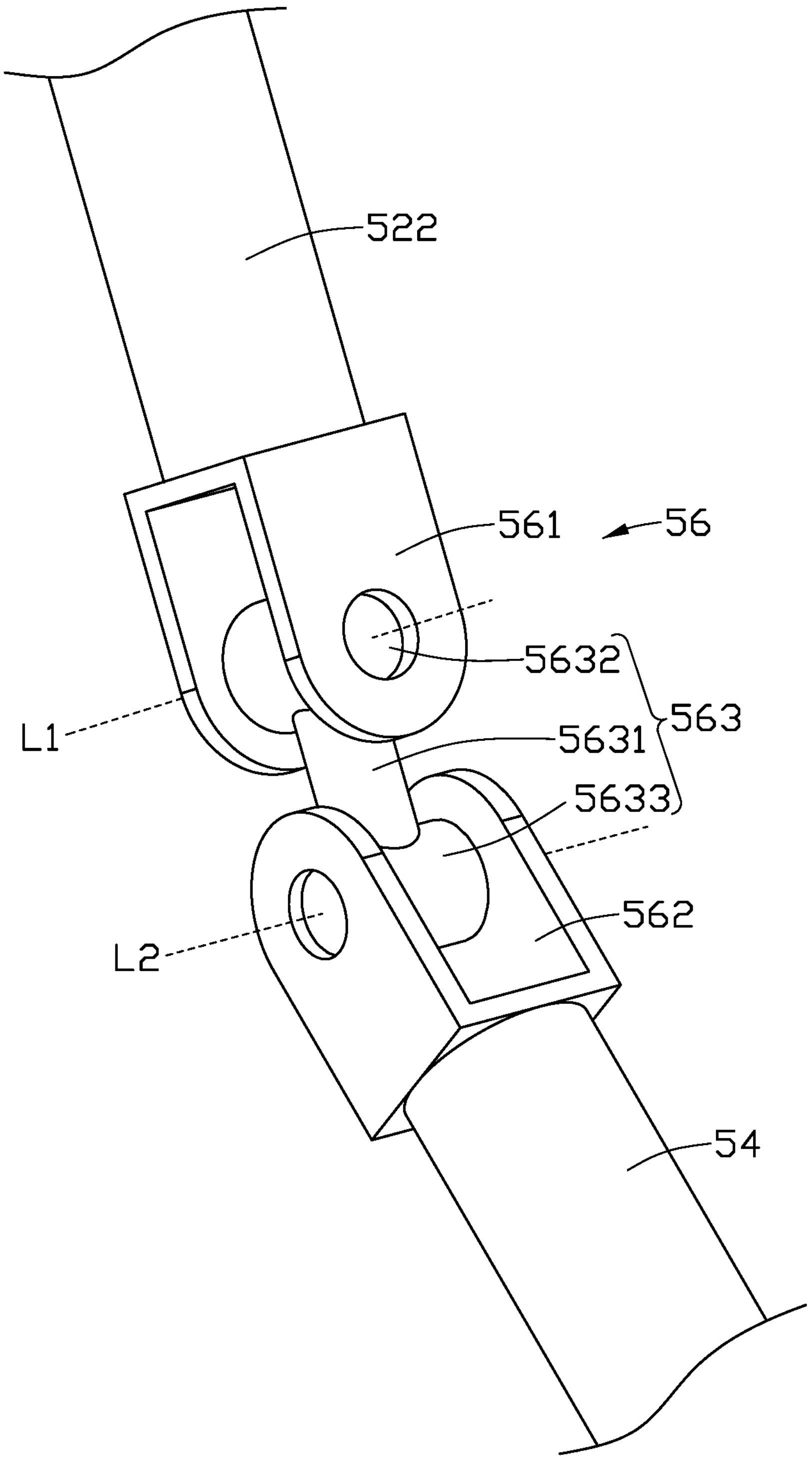
FIG. 4 is a partial structural diagram of a support member of the auxiliary stimulating apparatus shown in FIG. 2.

Specifically, referring to FIG. 4, the second connecting portion 56 comprises a first connecting member 561, a second connecting member 562, and an adaptor 563. The first connecting member 561 and the second connecting end 522 of the support portion 52 are integrally formed, and the second connecting member 562 and the second branch portion 54 are integrally formed. The adaptor 563 comprises a base 5631, a first coupling portion 5632 and a second coupling portion 5633. The first coupling portion 5632 and the second coupling portion 5633 are located at two ends of the base 5631 respectively, the first coupling portion 5632 is rotatable around the first axis L1 relative to the first connecting member 561, and the second coupling portion 5633 is rotatable around the second axis L2 relative to the second connecting member 562, the first axis L1 is perpendicular to the second axis L2. In this way, the first transverse portion 14 and the second transverse portion 15 are rotatable relative to the first vertical portion 11 via the support member 50, and when the user pushes the first transverse portion 14 and/or the second transverse portion 15, the first transverse portion 14 and/or the second transverse portion 15 can rotate relative to the first vertical portion 11 and be positioned in a certain position. Therefore, the user can arbitrarily adjust the posture of the auxiliary stimulating apparatus 100 according to the requirements, thereby obtaining a better experience.

The first branch portion 53 and the second branch portion 54 are respectively arranged in regions of the main body 10 corresponding to the first transverse portion 14 and the second transverse portion 15 respectively and are configured for supporting the corresponding transverse portion.

By rotatably connecting the respective connecting ends of the support portions 52 to the corresponding branch portion and the bracket 51, the user can arbitrarily adjust the posture of the auxiliary stimulating apparatus 100 according to requirements, so that the auxiliary stimulating apparatus 100 is in a lying state, a sitting state, etc., so as to meet various requirements of the user.

In this embodiment, the support portion 52 can be for example an inverted U shape. In other embodiments, the support portion 52 may also be in other shapes, such as an inverted V shape, which is not limited herein.

Figure 5:
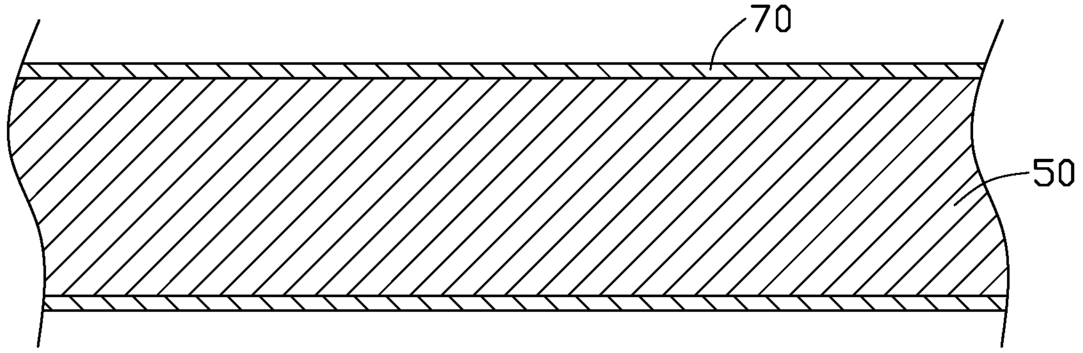
FIG. 5 is a cross-sectional view of the support member of the auxiliary stimulating apparatus shown in FIG. 4.

Referring to FIG. 5, the auxiliary stimulating apparatus 100 further comprises a covering member 70 wrapped around the support member 50 and is configured for reinforcing the connection between the support member 50 and the main body 10.

In this embodiment, the covering member 70 is a gauze, and the gauze is wound on the outer periphery of the support member 50, so that when manufacturing the auxiliary stimulating apparatus 100, the support member 50 can be better covered by the soft material, so as to improve the connection between the support member 50 and the main body 10.

Compared with the prior art, the sub-body 30 of the auxiliary stimulating apparatus 100 is configured to be detachably accommodated in the main body 10, the sub-body 30 can be detached from the main body 10 for cleaning after being used, without the need to remove the entire auxiliary stimulating apparatus 100 for cleaning, thereby facilitating use. On the other hand, the opening 311 is defined on the end of the sub-body 30 and the to-be-treated portion can be inserted into the opening 311, therefore, the user can remove the sub-body 30 from the main body 10 and use the sub-body 30 separately according to their own needs, which can meet various needs of the user and has flexible usability.

Second Embodiment

FIG. 6 to FIG. 9 illustrate a second embodiment of an auxiliary stimulating apparatus 100A. For the convenience of explanation, the components with the same functions as those described in the above embodiments are labeled with the same reference numerals, and their explanations are omitted.

Referring FIG. 6 to FIG. 9, the difference between the auxiliary stimulating apparatus 100A of this embodiment and the auxiliary stimulating apparatus 100 of the first embodiment is that the main body 10A and the support member 50A are different in structure, and other structures are the same as those in the first embodiment, which are not limited herein.

Figure 6:
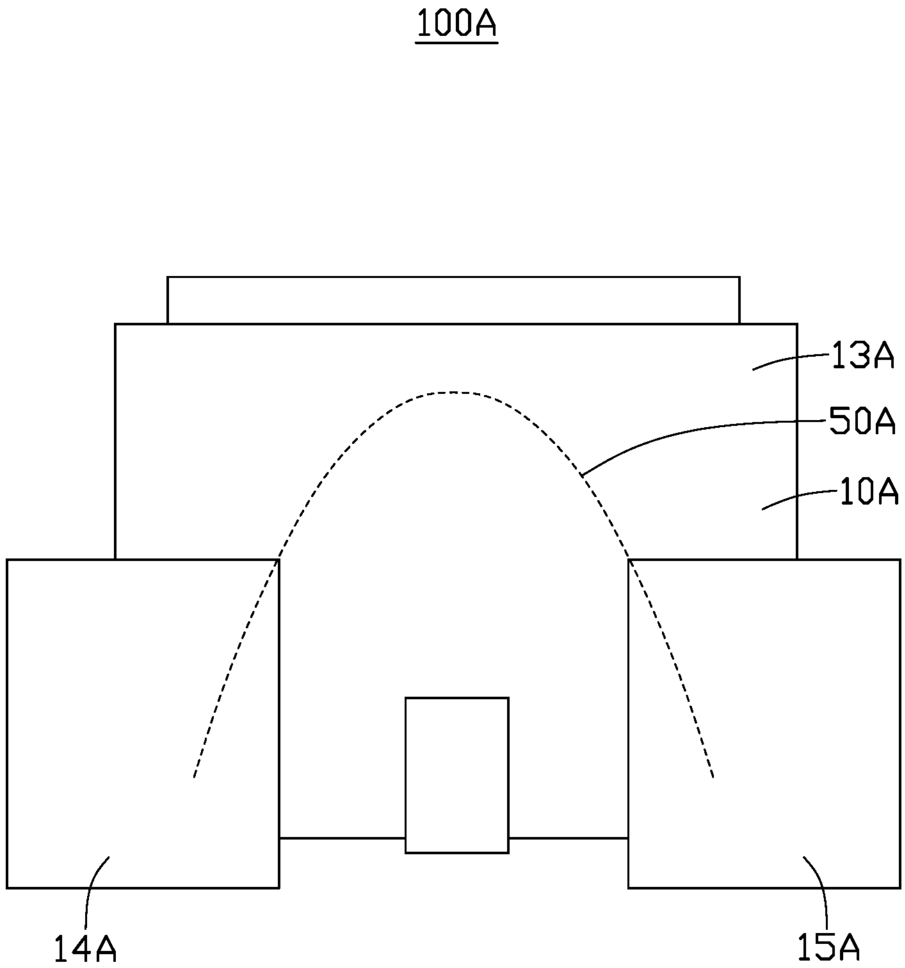
FIG. 6 is a schematic structure diagram of an auxiliary stimulating apparatus according to a second embodiment of the present disclosure.
Figure 7:
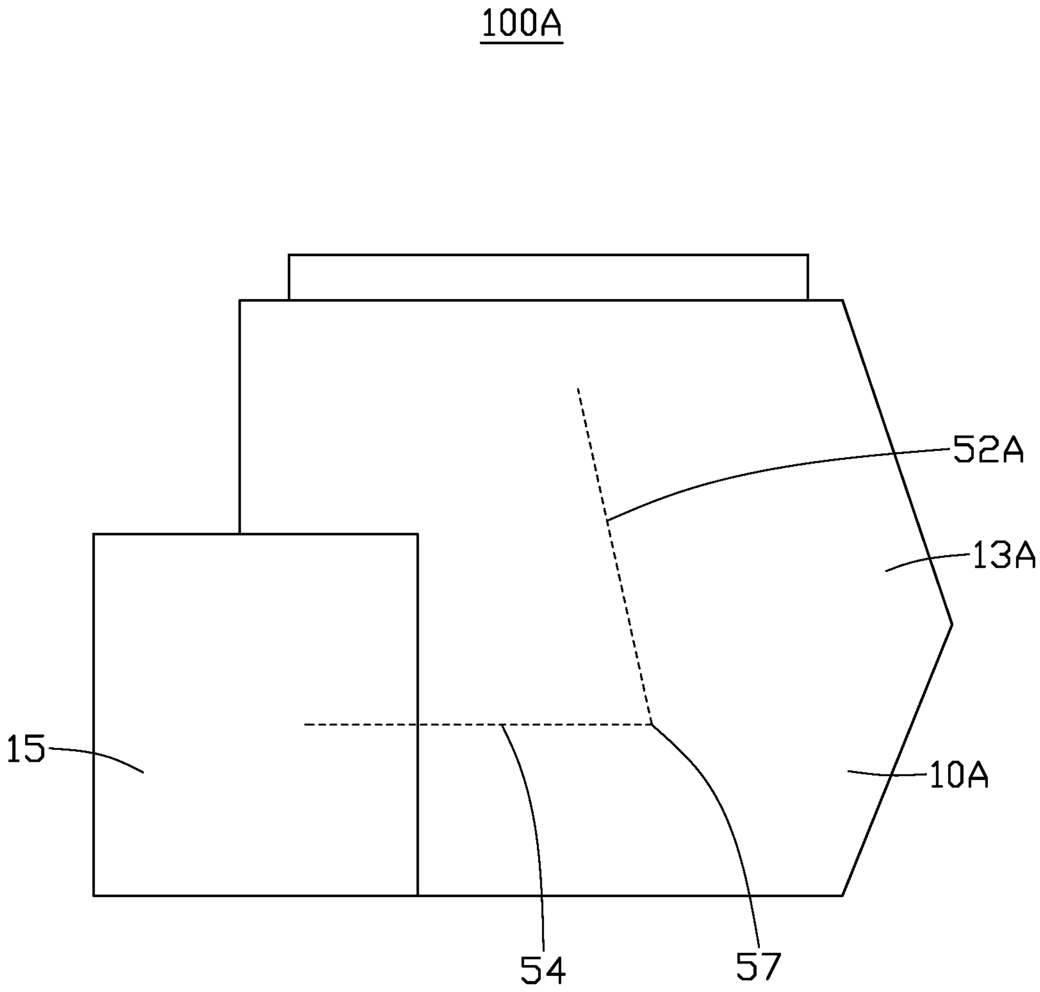
FIG. 7 is a side view of the auxiliary stimulating apparatus shown in FIG. 6.

Referring to FIGS. 6 to 7, the main body 10A comprises a first vertical portion 11A, a first transverse portion 14A and a second transverse portion 15A, the first transverse portion 14A and the second transverse portion 15A are connected to the same side of the first vertical portion 11A, and the channel 16 is defined at the bottom of the first vertical portion 11A and arranged between the first transverse portion 14A and the second transverse portion 15A. In this embodiment, the main body 10A can be switched between the folded state and the unfolded state via the support member 50A.

Specifically, the support member 50A comprises a support portion 52A, a first branch portion 53, a second branch portion 54, and a pair of third connecting portions 57. The support portion 52A is arranged in a region of the main body 10 corresponding to the first vertical portion 11A, the support portion 52A comprises a first connecting end 521 and a second connecting end 522. The first connecting end 521 and the second connecting end 522 are located at the same side of the support portion 52A, and rotatably connected to the corresponding branch portion via the corresponding third connection section 57.

Figure 8:
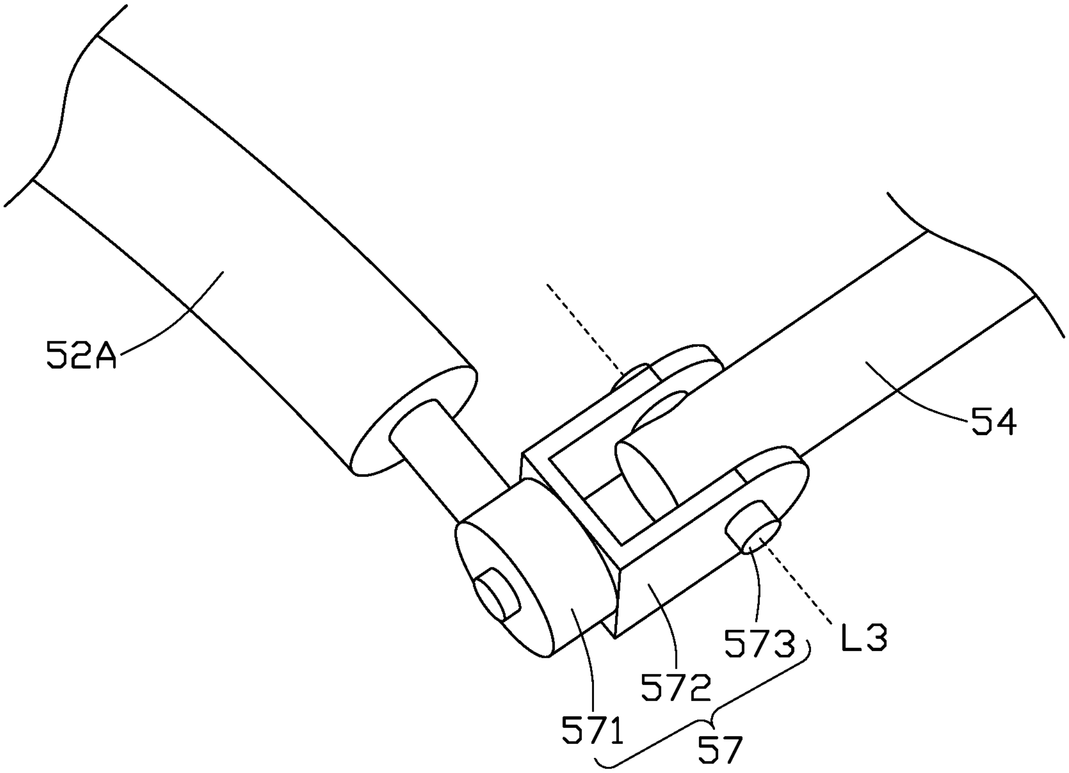
FIG. 8 is a partial structural view of the support member of the auxiliary stimulating apparatus shown in FIG. 6.

Specifically, referring to FIG. 8, each of the pair of third connecting portions 57 comprises a connecting member 572 and an adaptor 573. The connecting member 572 is integrally formed with the support portion 52A, the adaptor 573 is rotatably connected to the first connecting member 571, and is connected to the second branch portion 54, so that the first branch portion 53 and the second branch portion 54 are rotatable around the third axis L3 relative to the support portion 52A, therefore, the first transverse portion 14A and the second transverse portion 15A are rotatable relative to the first vertical portion 11A via the support member 50A, and when the user pushes the first transverse portion 14A and/or the second transverse portion 15A, the first transverse portion 14A and/or the second transverse portion 15A can rotate relative to the first vertical portion 11A and be positioned in a certain position. In this way, the user may arbitrarily adjust the posture of the auxiliary stimulating apparatus 100A according to requirements, thereby obtaining a better experience.

Figure 9:
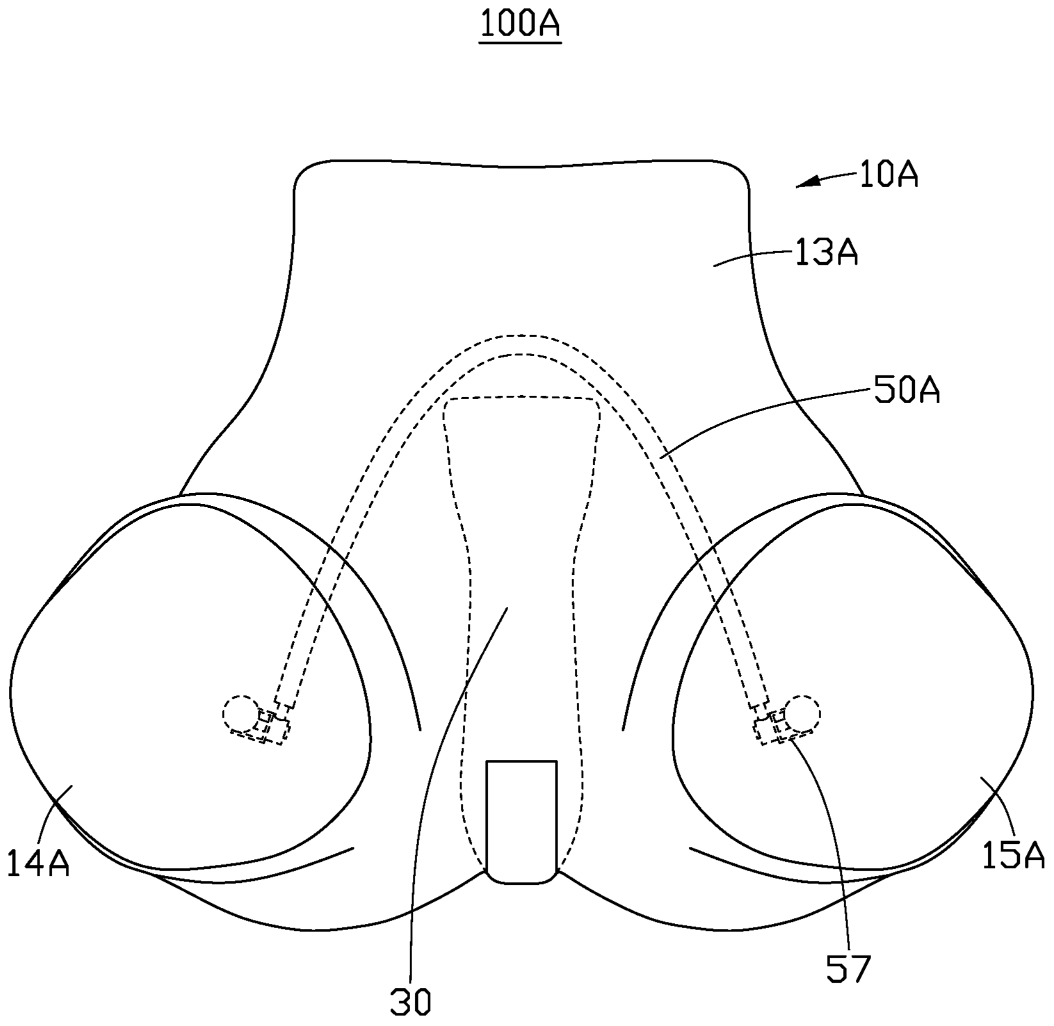
FIG. 9 is a front view of the auxiliary stimulating apparatus provided by an embodiment of the present disclosure.
Figure 10:
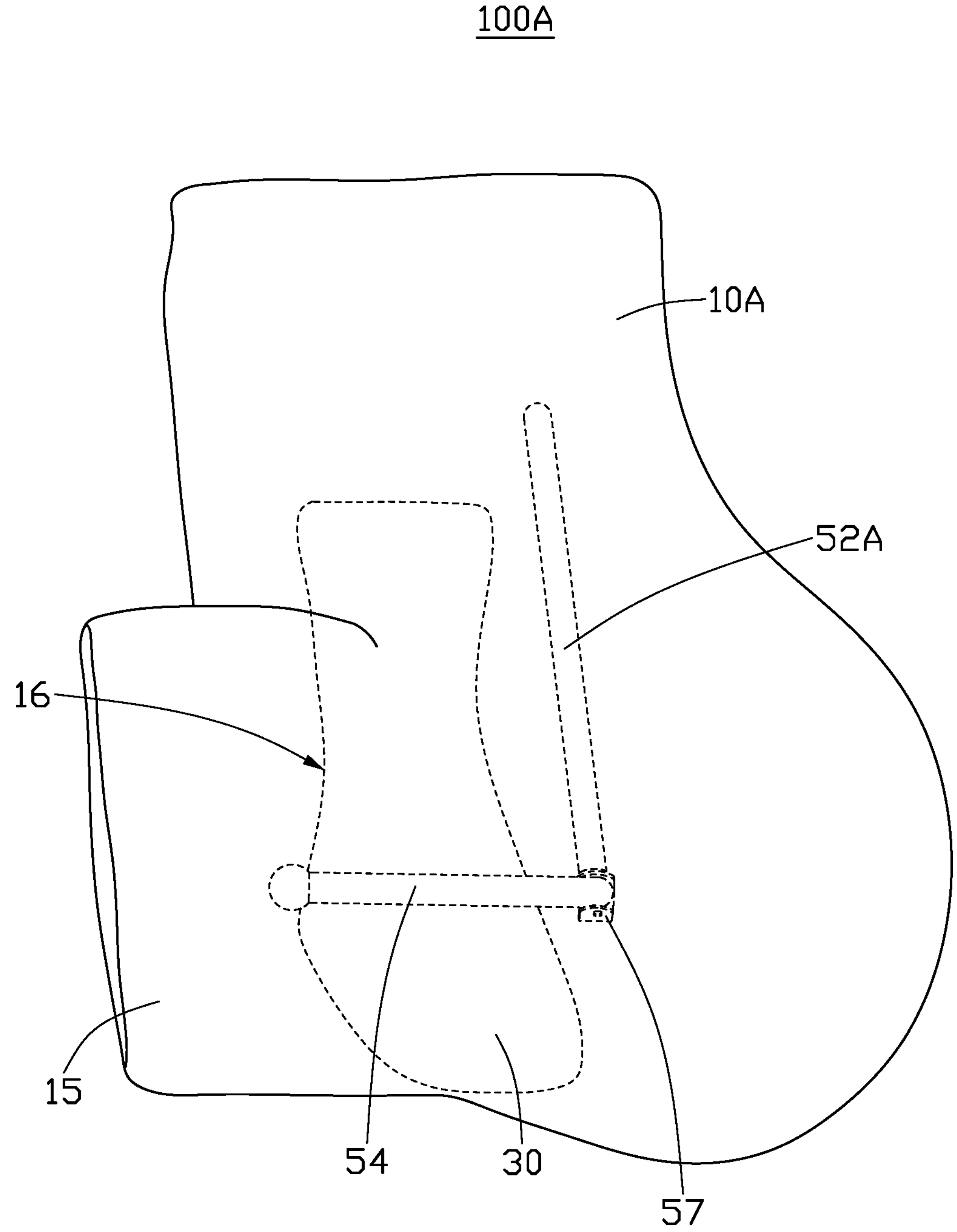
FIG. 10 is a side view of the auxiliary stimulating apparatus shown in FIG. 9.

In addition, referring to FIGS. 9 to 10, FIGS. 9 to 10 show the auxiliary stimulating apparatus 100A provided by an embodiment of the present disclosure.

Figure 11:
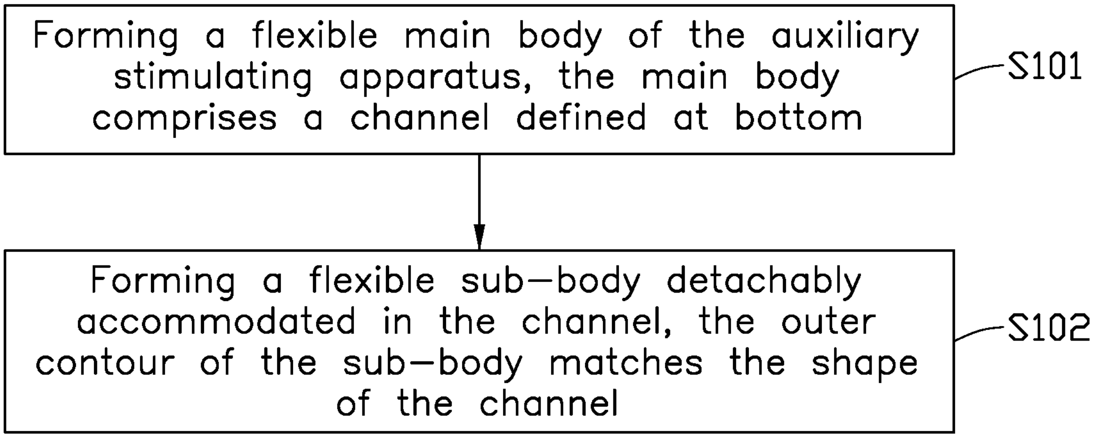
FIG. 11 is a flowchart of a manufacturing method for the auxiliary stimulating apparatus according to an embodiment of the present disclosure.

Referring to FIG. 11, the present disclosure further provides a manufacturing method for the auxiliary stimulating apparatus, comprising the following steps.

Step S101, forming a flexible main body of the auxiliary stimulating apparatus, the main body comprises a channel defined at bottom.

In this embodiment, the channel is configured for being hollow and extended from an outer side of the main body to an inner side of the main body.

Step S102, forming a flexible sub-body detachably accommodated in the channel, the outer contour of the sub-body matches the shape of the channel.

In this embodiment, the sub-body comprises an opening defined on one end of the sub-body and is exposed exterior to the channel when the sub-body is received in the channel, and the cavity is defined inside the sub-body, the cavity is in air communication with the opening, so that the to-be-treated portion is insertable into the cavity via the opening.

Figure 12:
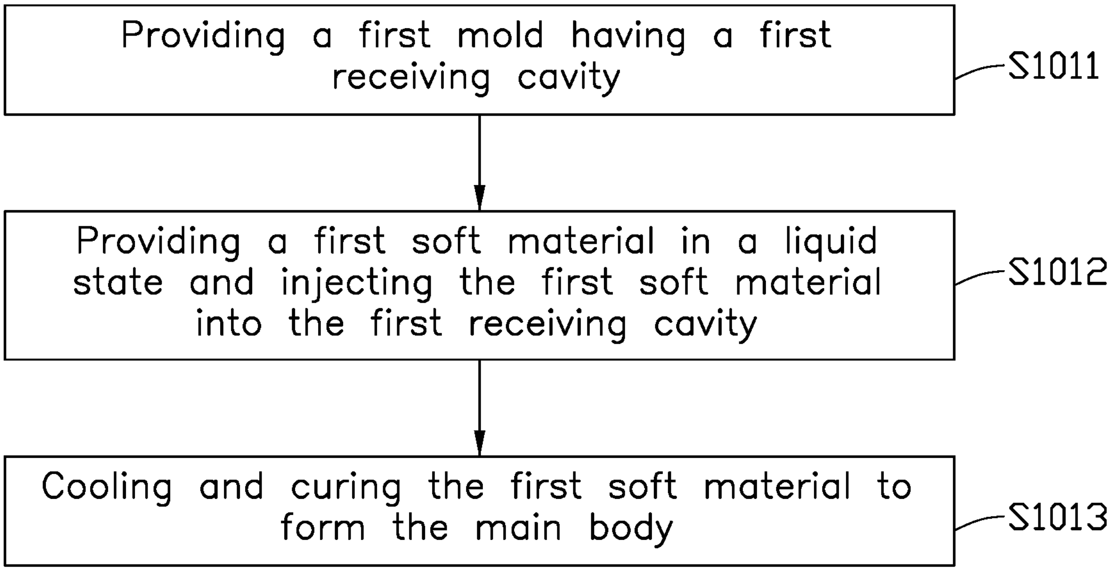
FIG. 12 is a flowchart of Step S101 of the manufacturing method for the auxiliary stimulating apparatus shown in FIG. 11.
Figure 13:
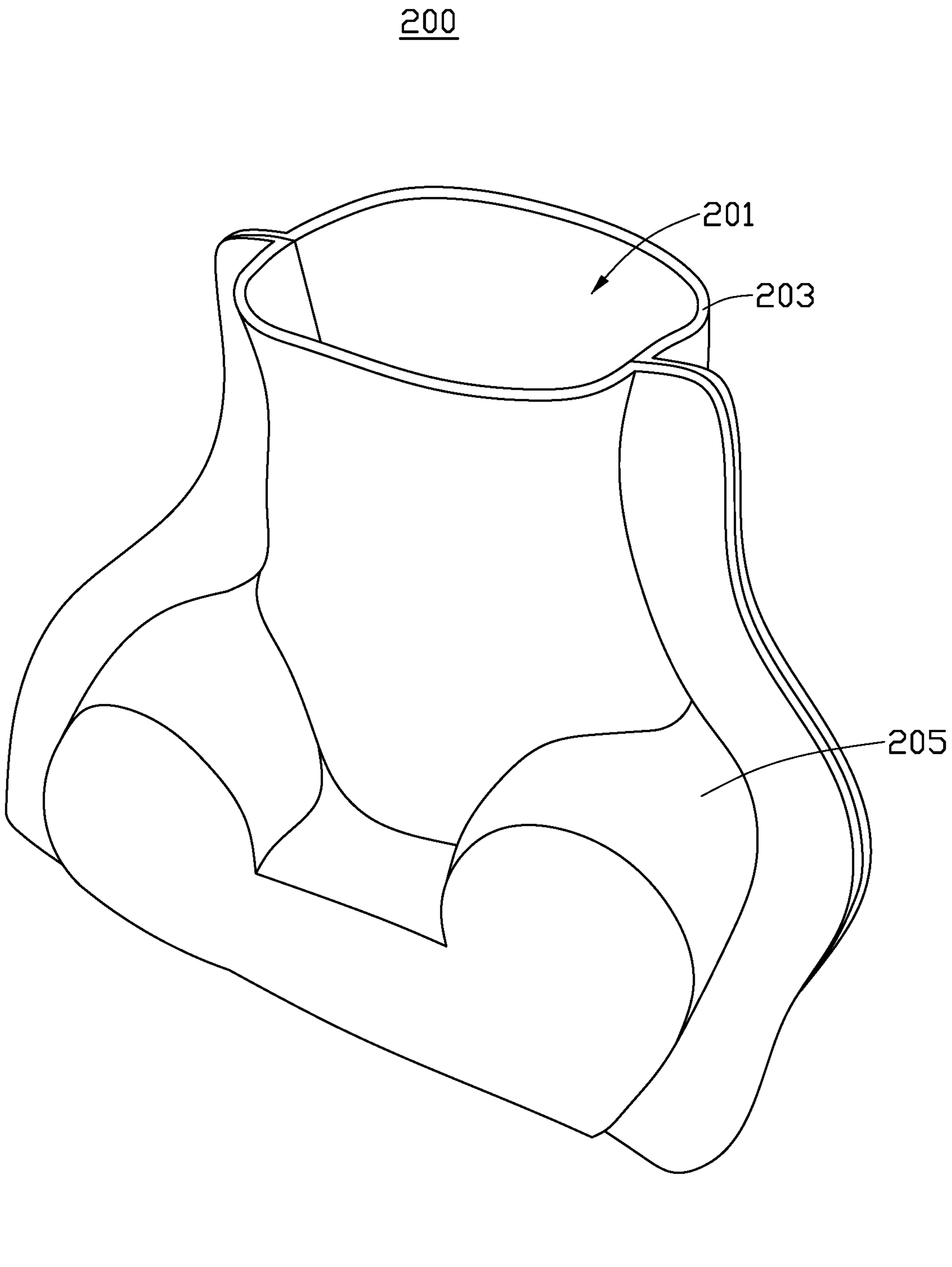
FIG. 13 is a schematic structure diagram of a first mold configured for manufacturing a main body.
Figure 14:
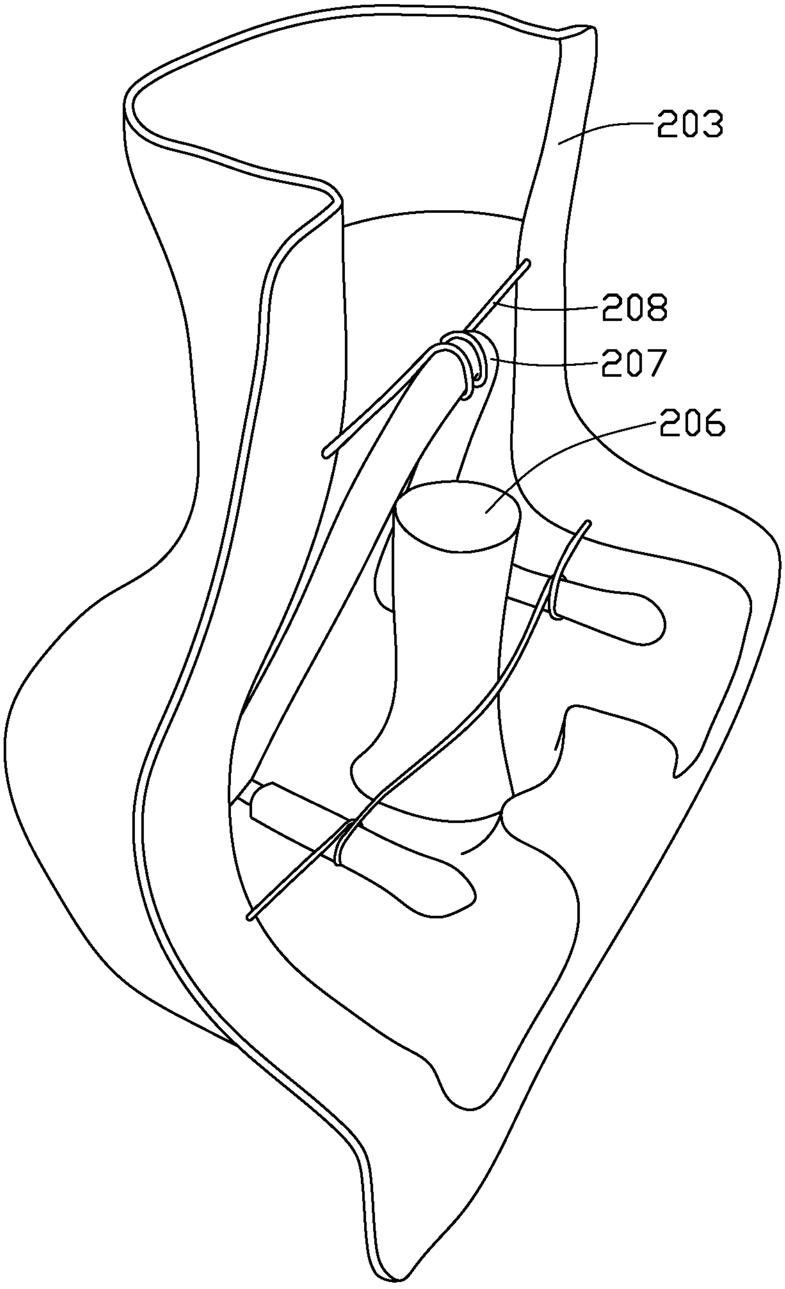
FIG. 14 is a schematic structure diagram of a first sub-mold of the first mold shown in FIG. 13.

Referring to FIGS. 12 to 14, the step of forming the main body of the auxiliary stimulating apparatus further comprises:

Step S1011, providing a first mold 200 having a first receiving cavity 201;

Step S1012, providing a first soft material in a liquid state and injecting the first soft material into the first receiving cavity 201; and Step S1013, cooling and curing the first soft material to form the main body.

In this embodiment, the first mold 200 comprises a first sub-mold 203 and a second sub-mold 205 configured for attaching to the first sub-mold 203, so as to form the first receiving cavity 201. A shape of the first receiving cavity 201 is the same as the contour of the main body.

In addition, the first mold 200 further comprises a first stem 206, the first stem 206 is arranged on a bottom of the first receiving cavity 201 corresponding to the hollow channel and configured to form the hollow channel.

Figure 15:
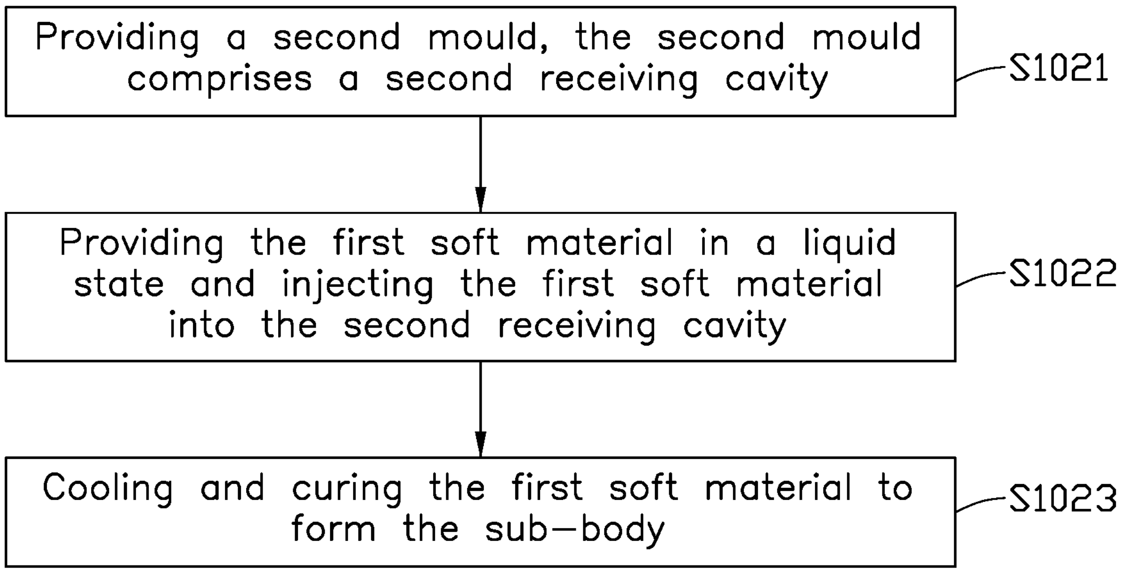
FIG. 15 is a flowchart of Step S102 of the manufacturing method for the auxiliary stimulating apparatus shown in FIG. 11.
Figure 16:
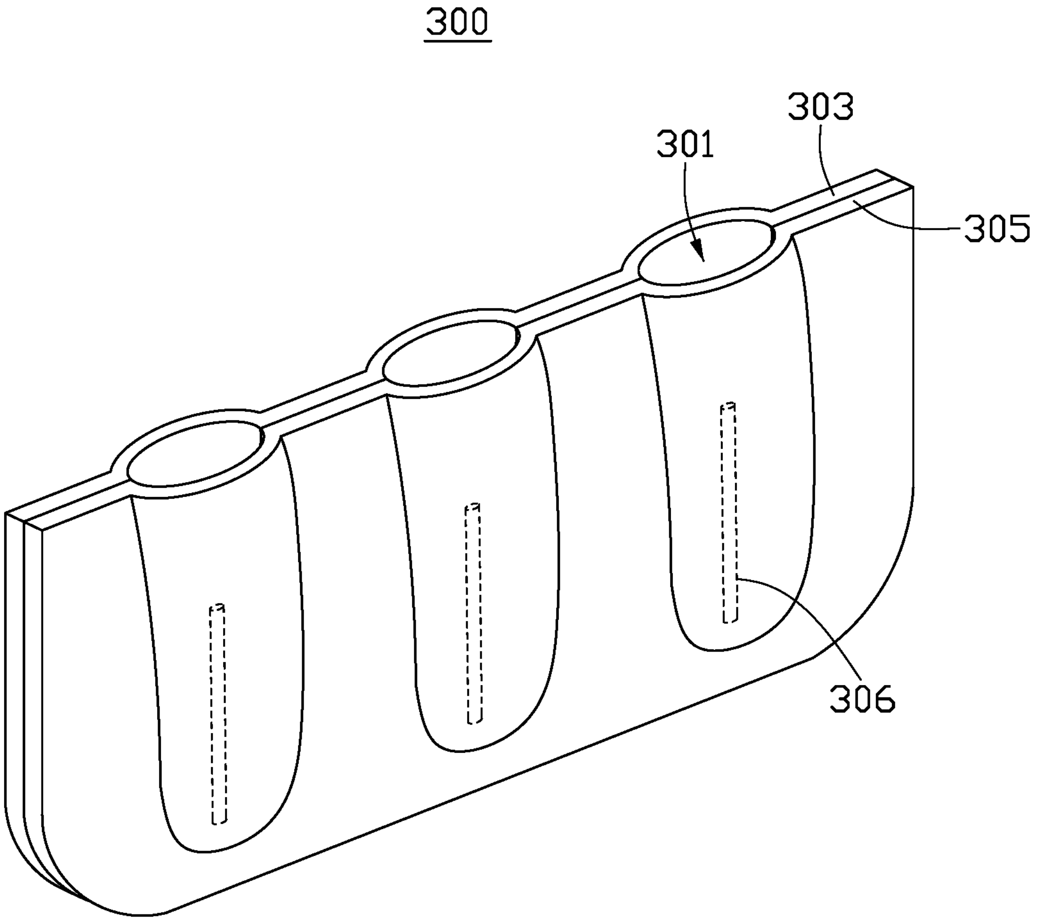
FIG. 16 is a schematic structure diagram of a second mold configured for manufacturing a sub-body.

Referring to FIGS. 15 to 16, the step of forming the sub-body further comprises:

Step S1021, providing a second mold 300, the second mold 300 comprises a second receiving cavity 301, and the shape of the second receiving cavity 301 matches the outer contour of the sub-body of the auxiliary stimulating apparatus;

Step S1022, providing the first soft material in a liquid state and injecting the first soft material into the second receiving cavity 301; and Step S1023, cooling and curing the first soft material to form the sub-body.

In this embodiment, the second mold 300 comprises a third sub-mold 303 and a fourth sub-mold 305 configured for attaching to the third sub-mold 303, so as to form the second receiving cavity 301. A shape of the second receiving cavity 301 is the same as the contour of the sub-body.

In addition, the second mold 300 further comprises a second stem 306, the second stem 306 is arranged on a bottom of the second receiving cavity 301 corresponding to the cavity and configured to form the cavity.

Figure 17:
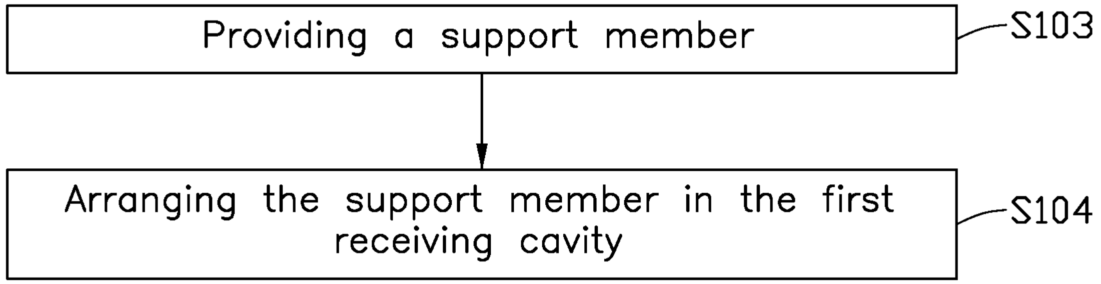
FIG. 17 is a flowchart of the manufacturing method for the auxiliary stimulating apparatus according to another embodiment of the present disclosure.

Referring to FIG. 17, in another embodiment, before the first soft material is injected, the manufacturing method further comprises:

Step S103, providing a support element 207; and

Step S104, arranging the support element 207 in the first receiving cavity 201.

In this embodiment, the support element 207 is arranged in the first receiving cavity 201 by a cord 208. After the first soft material is injected into the first receiving cavity 201, while the cord 208 can fix the support element 207 in the first receiving cavity 201, the cord 208 is relatively thin and will not affect the softness of the main body.

Figure 18:
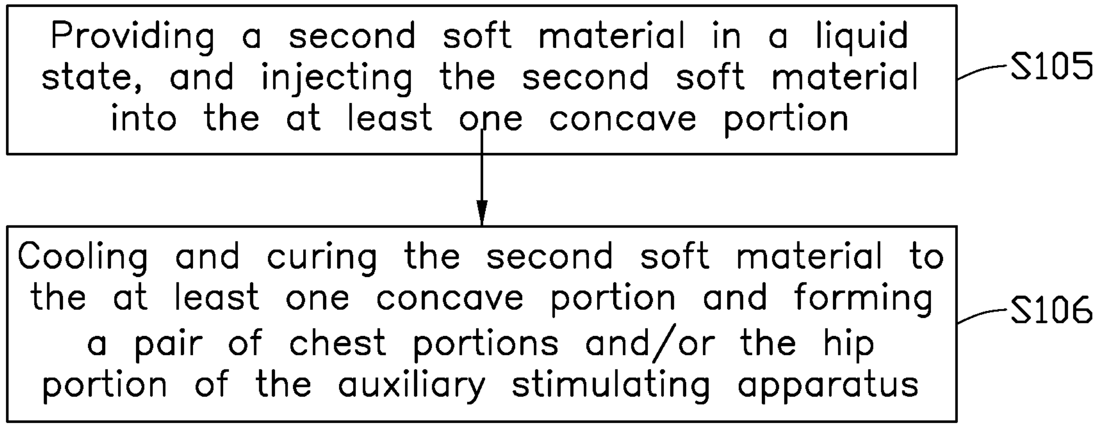
FIG. 18 is a flowchart of the manufacturing method for the auxiliary stimulating apparatus according to yet another embodiment of the present disclosure.

Referring to FIG. 18, in another embodiment, the first receiving cavity 201 comprises at least one concave portion 2011, the at least one concave portion 2011 corresponding to the pair of second software portion and/or the first software portion of the auxiliary stimulating apparatus, before the step of providing the first soft material in a liquid state and injecting the first soft material into the first receiving cavity 201, the manufacturing method further comprises:

Step S105, providing a second soft material in a liquid state, and injecting the second soft material into the at least one concave portion 2011;

Step S106, cooling and curing the second soft material to form the pair of second software portion and/or the first software portion of the auxiliary stimulating apparatus.

In addition, a softness of the second soft material is greater than a softness of the first soft material.

In addition, those skilled in the art should understand that the above embodiments are only used to illustrate the present disclosure, but not used to limit the present disclosure, and appropriate changes and modifications made to the above embodiments belong to the scope of the disclosure of the present disclosure as long as they are within the scope of the substantive spirit of the present disclosure.

What is claimed is:

1. An auxiliary stimulating apparatus providing a cavity for accommodating a to-be-treated portion, so as to provide massage experience by friction between the to-be-treated portion and a cavity wall surrounding the cavity, and comprising:

a flexible main body comprising a channel, wherein the channel is hollow and extends from an outer side of the flexible main body to an inner side of the flexible main body, the flexible main body further comprises a first vertical portion, a first transverse portion and a second transverse portion extending from a same end of the first vertical portion, and the channel is defined at a junction of the first transverse portion and the second transverse portion;

a flexible sub-body configured for being detachably accommodated in the channel of the main flexible body, wherein the flexible sub-body comprises an opening defined on one end of the flexible sub-body and is exposed exterior to the channel when the flexible sub-body is received in the channel, and the cavity is defined inside the flexible sub-body, the cavity is in air communication with the opening, such that the to-be-treated portion is insertable into the cavity via the opening;

a metal support member arranged in and surrounded by the flexible main body, wherein the metal support member comprises a support portion arranged in the flexible main body corresponding to the first vertical portion, a first branch portion and a second branch portion arranged in the flexible main body corresponding to the first transverse portion and the second transverse portion, respectively, the support portion is in a rod-shaped structure, and comprises a middle portion, a first extending portion and a second extending portion extending from both ends of the middle portion, respectively, the first extending portion and the second extending portion are outwardly expanded; and a gauze element wrapped on the metal support member and configured for reinforcing a connection between the metal support member and the main body.

2. The auxiliary stimulating apparatus according to claim 1, wherein a weight ratio of the flexible sub-body to the flexible main body is no more than 30%.

3. The auxiliary stimulating apparatus according to claim 1, wherein the flexible sub-body comprises a first section, a second section, and a third section arranged between the first section and the second section, the opening is defined at an end of the first section away from the third section, and an outer diameter of the second section is greater than an outer diameter of the third section.

4. The auxiliary stimulating apparatus according to claim 3, wherein an outer diameter of the first section is greater than the outer diameter of the third section.

5. The auxiliary stimulating apparatus according to claim 1, wherein the first branch portion comprises a first connecting end and the second branch portion comprises a second connecting end, the first connecting end and the second connecting end are arranged at intervals on the same side of the support portion, the first branch portion is rotatably connected to the first connecting end, the second branch portion is rotatably connected to the second connecting end, so that the first transverse portion and the second transverse portion are rotatable relative to the first vertical portion via the metal support member.

6. The auxiliary stimulating apparatus according to claim 5, wherein the flexible main body further comprises an upper body, and the upper body is arranged on one side of the first vertical portion away from the first transverse portion and the second transverse portion, the support portion comprises a third connecting end located at one side of the support portion adjacent to the upper body, the metal support member further comprises a bracket arranged in the main body corresponding to the upper body, one end of the bracket is rotatably connected to the third connecting end of the support portion, so that the upper body is rotatable relative to the first vertical portion via the bracket.

7. The auxiliary stimulating apparatus according to claim 6, wherein the bracket has an inversed T shape.

8. The auxiliary stimulating apparatus according to claim 6, wherein the bracket comprises a first rod extending along a lateral direction of the main body and a second rod extending along a longitudinal direction of the main body, the first rod is coupled to the second rod.

9. The auxiliary stimulating apparatus according to claim 1, wherein the support portion has an inversed U or V shape.

10. The auxiliary stimulating apparatus according to claim 1, wherein each of the first vertical portion, the first transverse portion and the second transverse portion comprises a first soft portion and a second soft portion integrally formed with the first soft portion, the first soft portion is made of the first soft material, the second soft portion is made of a second soft material, and a softness of the second soft material is greater than a softness of the first soft material.

11. The auxiliary stimulating apparatus according to claim 10, wherein the second soft material comprises white mineral oil and thermoplastic elastomer (TPE) material, and the white mineral oil and the TPE material are mixed in a mass ratio from 1:20 to 1:30.

12. The auxiliary stimulating apparatus according to claim 10, wherein the first soft material comprises white mineral oil and TPE material, and the white mineral oil and the TPE material are mixed in a mass ratio from 1:9 to 1:10.

13. The auxiliary stimulating apparatus according to claim 10, wherein the sub-body and the first soft portion are made of the first soft material.

14. The auxiliary stimulating apparatus according to claim 1, wherein the sub-body is an integrally molded component.

15. An auxiliary stimulating apparatus comprising:

a flexible body comprising a cavity configured for a male sexual organ to extend through, a cavity wall surrounding the cavity configured to provide frictional movements between the male sexual organ and the cavity wall, wherein the flexible body comprises an opening defined on one end of the flexible body, and the cavity is defined inside the flexible body, the cavity is in air communication with the opening, such that the male sexual organ is insertable into the cavity via the opening;

a metal support member arranged in the flexible body and configured for supporting the flexible body, wherein an outer surface of the metal support member is surrounded by the flexible body; and a gauze element arranged between the flexible body and the metal support member.

* * * * *